United States Patent
Yanaka

(10) Patent No.: US 6,932,322 B2
(45) Date of Patent: Aug. 23, 2005

(54) VALVE BODY OF AN ON-OFF VALVE AND A METHOD FOR MANUFACTURING THE SAME

(75) Inventor: Yuzuru Yanaka, Iwate-Gun (JP)

(73) Assignee: Zama Japan (JP)

( * ) Notice: Subject to any disclaimer, the term of this patent is extended or adjusted under 35 U.S.C. 154(b) by 38 days.

(21) Appl. No.: 10/423,491

(22) Filed: Apr. 25, 2003

(65) Prior Publication Data

US 2004/0046145 A1 Mar. 11, 2004

(30) Foreign Application Priority Data

Apr. 26, 2002 (JP) ........................................ 2002-125890

(51) Int. Cl.[7] ............................. F16K 1/00; F16K 15/00
(52) U.S. Cl. ...................................................... 251/332
(58) Field of Search ................................ 251/332, 356

(56) References Cited

U.S. PATENT DOCUMENTS

| | | | | |
|---|---|---|---|---|
| 3,326,521 A | * | 6/1967 | Murray ........................ | 251/358 |
| 3,791,632 A | * | 2/1974 | Donovan ...................... | 261/35 |
| 4,211,386 A | * | 7/1980 | Yocum et al. ............... | 251/122 |
| 4,525,910 A | * | 7/1985 | Boehmer ................ | 29/890.127 |
| 5,052,435 A | * | 10/1991 | Crudup et al. .......... | 137/516.29 |

* cited by examiner

Primary Examiner—Edward K. Look
Assistant Examiner—John K. Fristoe, Jr.
(74) Attorney, Agent, or Firm—Orrick, Herrington & Sutcliffe LLP

(57) ABSTRACT

A valve body of an on-off valve that minimizes the deviation of opening and closing characteristics of a valve member made of an elastic polymer material and provided in a valve body of the on-off valve due to expansion caused by the fluid handled thereby and that maintains the specified opening and closing operation. A base portion of the valve member made with an elastic polymer material is inserted in an attachment hole of a valve element of a valve body with space constituted by a small-diameter-hole portion left at the hole bottom. A constricted-diameter portion formed in a tip opening of the attachment hole is embedded in the valve member to secure the base portion of the valve member. Axial elongation due to swelling of the valve member is distributed as forward elongation and rearward elongation sandwiching the site of securing by the constricted-diameter portion, which minimizes the axial elongation of a tip portion with a valve face and curtails deviation from the settings for on-off timing.

14 Claims, 3 Drawing Sheets

VALVE BODY OF AN ON-OFF VALVE AND A METHOD FOR MANUFACTURING THE SAME

FIELD OF THE INVENTION

The invention relates to a valve body of an on-off valve that works in concert with a valve seat to open and close a fluid passage by operating in a direction perpendicular to the closed face of the valve body and, in particular, relates to a valve body suited to control fluid flow of liquid fuel supplied to an engine that causes the swelling of a valve member forming a valve face.

BACKGROUND OF THE INVENTION

Valve bodies of on-off valves that control liquid fuel supplied to automobile engines and general-purpose engines include on-off valves that work in concert with a valve seat to open and close a fluid passage by causing the valve body to operate in a direction perpendicular to the closed face. In addition to being durable, these valves are required to be highly fluid tight and dimensionally precise in order to maintain engine performance.

A typical on-off valve that controls liquid fuel supplied to an engine is an inlet valve located at the inlet portion of a fixed fuel chamber to control liquid fuel sent from a fuel pump to a float-type or diaphragm-type fixed fuel chamber of an carburetor. The valve body thereof moves linearly in compliance with a lever that rotates in accordance with the rising or falling of the float or the displacement of the diaphragm, controlling the flow of the liquid fuel in concert with a valve seat provided in a fuel passage.

There are carburetors and, in particular, carburetors for small-exhaust-volume general-purpose engines handle liquid fuel at extremely low flow rates. In such cases a minor deviation in the fuel flow rate greatly affects engine performance. As a result, the fuel passage must be completely closed when the inlet valve is closed and must faithfully open in response to movement of the float or diaphragm, i.e. a drop in fuel in the fixed fuel chamber. As such, the portion forming the valve face for the valve seat of the valve body is made of an elastic polymer material with excellent oil resistance, such as fluororubber, and is made to be both durable and fluid tight with consideration going to minimizing swelling.

FIGS. 4(A) and (B) illustrate valve bodies currently used in an inlet valve of a diaphragm-type fixed-fuel chamber. The valve body shown in FIG. 4(A) comprises an injection hole 52 at the tip portion of a metal round-axle valve element 51 with axial grooves. A base portion 54 of a valve member 53 made of fluororubber fills the injection hole 52, and a forward-protruding tip portion 55 is given a conical shape. In FIG. 4(B), a short axle 58 and a conical head 59 protrude in a unitary manner from the tip of a metal round-axle valve element 57 with axial grooves similar to that noted above. A conical valve member 60 made of fluororubber is firmly joined to the head 59.

In each of the valve bodies mentioned above, the valve members 53, 60 are formed with injection molding using a metal die that forms a conical valve face. The portion to become the valve face is then polished to provide the prescribed conical shape of the apex. Extensive manufacturing equipment is required as a result.

In addition, a variety of liquid fuels such as a fuel blended to meet exhaust gas regulations or a fuel used for inspection and adjustment during the manufacture of the carburetor in addition to gasoline and ethanol-blended gasoline, which are widely known liquid fuels, flow over the periphery of the valve body for an extended period of time. The valve members 53, 60, as a result, make contact with the variety of liquid fuels for an extended period of time and unavoidably swell.

FIGS. 5(A) and (B) illustrate the conditions in the system before and after swelling when the valve body of FIG. 4(A) is used as the inlet valve of the diaphragm-type fixed fuel chamber. A base portion of the round axle unit 51 is attached to the tip of a lever 66 rotatably supported by a pin 65. The valve member 53 is brought into tight contact with a valve seat 68 and closes a fuel passage 69 under the spring force of a valve-closing spring 67 that acts on the lever 66. The base portion of the lever 66 and the central portion of the diaphragm 70 are, as shown in FIG. 5(A), adjusted so as to have a slight gap "a".

When the volume of fuel in a fixed fuel chamber 71 drops, the diaphragm 70 is displaced toward the fixed fuel chamber 71 and rotates the lever 66 clockwise as shown in the drawing to cause the valve member 53 to separate from the valve seat 68, whereupon fuel is introduced into the fixed fuel chamber 71. When the volume of fuel in the fixed fuel chamber 71 rises, the diaphragm 70 is displaced in the opposite direction to that previously mentioned, and the lever 66 rotates counterclockwise, seating the valve member 53 on the valve seat 68. Therefore, in order for a fixed volume of fuel to be accurately provided to the fixed fuel chamber 71 and fuel to be supplied to the engine at an accurate flow rate, the gap "a" and the load characteristics of the valve-closing spring 67 must be appropriately set, and the gap "a" must be precisely adjusted.

But swelling of the valve member 53 appears as elongation in the axial direction. When the swelling of the valve member 53 shown in FIG. 5(B) results in elongation to the extent of "c" in the axial direction in comparison to the valve member 53 in FIG. 5(A) prior to swelling, the elongation "c" separates the base portion of the lever 66 from the diaphragm 70 by the lever ratio of L2:L1, which widens the gap "a to b" and compresses the valve-closing spring 67, changing its load characteristics. Therefore, the fuel passage 69 is closed to the extent of dramatically decreasing the volume of fuel in the fixed fuel chamber 71 compared to that before swelling. The fuel passage 69 is closed when a volume of fuel less than that supplied before swelling is introduced, which causes the flow rate of fuel supplied to the engine to drop and thereby negatively affects engine performance and the condition of the exhaust.

This phenomenon also occurs with the valve body shown in FIG. 4 (B). However, the impact due to swelling is larger with the valve body shown in FIG. 4(A), in which the axial length of the valve member 53 is longer than that of the valve member 60 in FIG. 4(B).

Thus, it is desirable to provide a valve body for resolving the problems associated with prior-art valve bodies comprising a valve member made of an elastic polymer material such as fluororubber and located at the tip of a valve element—i.e., manufacturing can be problematic and tend to require extensive equipment to form the valve member such as metal dies for injection molding, and thus high costs are therefore unavoidable, and axial elongation due to the swelling of the valve member directly impacts the fuel flow rate—, that can be easily manufactured without the use of a metal die and that greatly reduces the negative effect of swelling on performance during the control of the flow rate of fuel.

SUMMARY OF THE INVENTION

In the present invention, a base portion of a valve member is inserted and fastened in a hole provided at a tip portion of a valve element with space remaining at the hole bottom, and a valve face is formed on a tip portion of the valve member, which protrudes from the front of the attachment hole, in order to reduce the negative influence of swelling on control performance associated with the valve body of on-off valves comprising on the tip of the valve element a valve member made of a polymer material that forms a valve face for a valve seat.

The axial elongation due to swelling when the valve member swells is divided into elongation toward the hole-bottom space of the base portion and elongation toward the front of the tip portion. The elongation of the tip portion as a result is less than the entire elongation, which reduces the deviation from the settings for on-off timing and thereby results in the reduction of the negative effects caused by swelling.

In addition, the present invention, in order to solve the above mentioned manufacturing-equipment-specific problem associated with the valve body of an on-off valve comprising a valve member made with an elastic polymer material that forms a valve face for the valve seat at the tip of a valve element made of metal or hard synthetic resin, involves manufacturing the valve body under a process comprising the steps of preparing a valve element comprising an attachment hole that opens to a tip face on a tip portion and an elastic member made of a polymer material inserted into the attachment hole with virtually no gap or inserting the elastic member in the attachment hole so that space remains at the hole bottom and the elastic member protrudes forward; securing the elastic member to the valve element by constricting the diameter of at least the tip opening of the attachment hole; and forming by machining a prescribed valve face of the elastic member that protrudes forward from the attachment hole.

In other words, the objective of manufacturing a valve body that reduces the negative effects due to swelling can be achieved using simple manufacturing equipment without dies in which an elastic member to become the valve member is inserted in the attachment hole and compressed to secure it, and the protruding portion is machined away.

Other aspects and features of the present invention will become apparent from consideration of the following description taken in conjunction with the accompanying drawings.

DETAILED DESCRIPTION OF PREFERRED EMBODIMENTS

Figure 1:
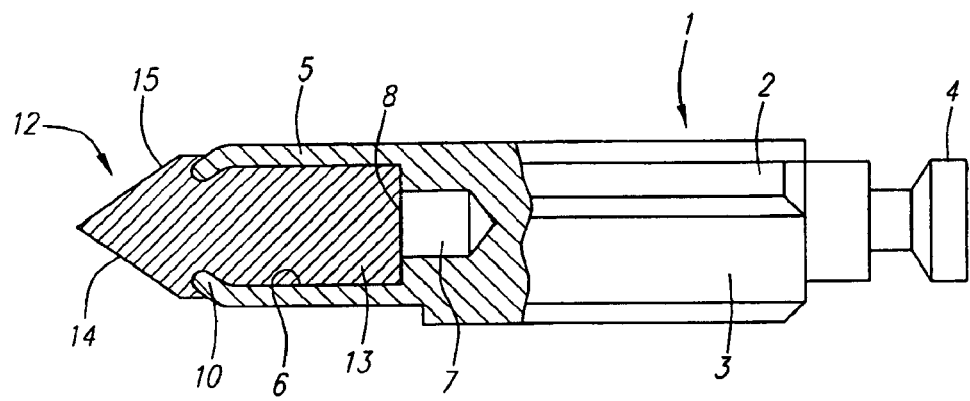
FIG. 1 is a partially cutaway plan view showing one embodiment of the valve body of the invention.

Embodiments of the invention will be discussed in reference to the drawings. FIG. 1 illustrates an embodiment in which the invention is applied to a valve element 1 used in an inlet valve of a diaphragm-type fixed fuel chamber of a carburetor. A valve element 1 comprises a surface made with a metal, generally aluminum, to which is applied a non-electrolyte nickel plating. The valve element 1 has a round axle form that can be inserted into the opening portion of the fuel passage to the fixed fuel chamber with almost no gap. The valve element 1 includes on its outer circumference thereof a communicating portion 2 with a plurality of axial grooves 3 that introduce a liquid fuel that passes through the valve seat to the fixed fuel chamber. On the base of the valve element 1 is an integrally formed latching portion 4 comprising a neck portion and a head unit for attaching to a tip of a lever that rotates in conformity to the displacement of the diaphragm. Protruding from the tip of the valve element 1 is a tubular portion 5. The tubular portion 5 has an outer diameter almost equivalent to the bottoms of the axial grooves 3.

The inner portion of the tubular portion 5 forms an attachment hole 6 that opens to the tip, and a small-diameter hole portion 7 extends through a step bore portion 8 in the inner end.

In the attachment hole 6 is a short, cylindrical base portion 13 of a valve member 12. The valve member 12 is preferably made of an elastic polymer material such as a fluorine resin, Nylon, polypropylene, NBR, or fluororubber but generally fluororubber that is inserted in an almost fluid tight manner superimposed on the stepped bore portion 8. The tip portion of the tubular portion 5, i.e., the cylindrical wall of the tip opening of the attachment hole 6, is compressed by constriction and the compressed diameter portion 10 thereby formed is embedded in the valve member 12 to secure the valve member 12. A tip portion 14 of the valve member 12 protruding forward from the attachment hole 6 is formed into a conical shape with a specified apex, and the outer circumference thereof forms a valve face 15 for a valve seat.

When this valve body opens or closes the fuel passage, the swelling of the valve member 12 due to the liquid fuel over time cannot be avoided. The valve member 12 in this embodiment in particular is longer in the axial direction than in diameter, so elongation in the axial direction due to swelling cannot be ignored. However, in this embodiment, as is shown in FIG. 1, the valve member 12 is secured by a compressed diameter portion 10 located nearer the tip than the middle area. Sandwiching the securing location, the conical tip portion 14 on the tip side of the valve member 12 elongates forward, while the cylindrical base portion 13 on the base side of the valve member 12 elongates rearward, entering into the hollow small-diameter hole portion 7 of the valve element 1.

Figures 5A, 5B:
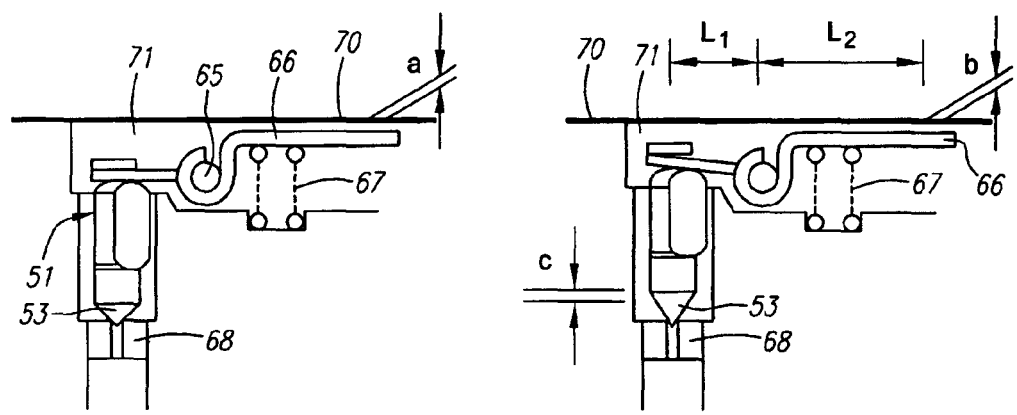
FIGS. 5(A) and (B) illustrate the differences in opening and closing characteristics before and after swelling.

In this manner, the axial elongation due to swelling is elongation to the front and elongation toward the rear sandwiching the compressed diameter portion 10. Because the forward portion of the valve member 12 forward of the compressed diameter portion 10 is axially shorter than the rearward portion thereof, the elongation of the tip portion 14 is very small, which drastically reduces the negative effects on open-shut performance as illustrated in FIGS. 5 (A) and (B).

Figure 2:
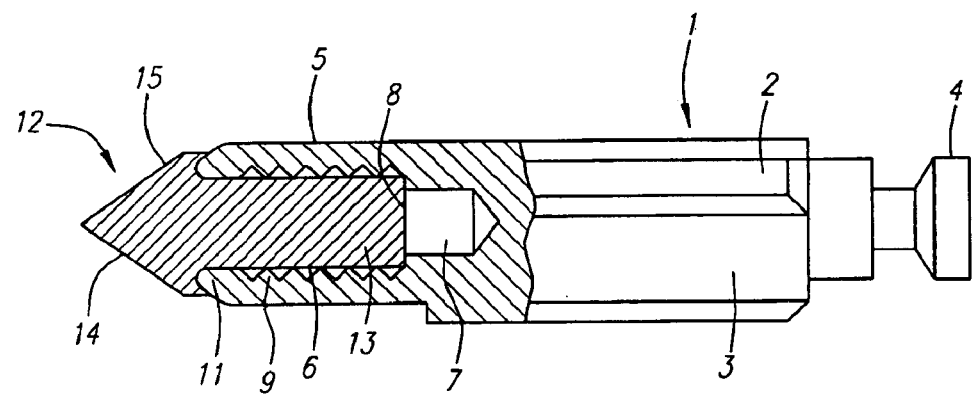
FIG. 2 is a partially cutaway plan view showing a different embodiment of the valve body of the invention.

FIG. 2 shows a different embodiment of the valve body—the fundamental construction of the valve element 1 and the valve member 12 is identical to that shown in FIG. 1, with the exception in this embodiment of toothing 9 comprising a female helix or an annular toothing pattern provided on the circumference of the attachment hole 6. The toothing 9, which is provided in the compressed diameter portion 11 by compressing the tip portion of the tubular portion 5, is deeply embedded into the base portion 13 to fasten the valve member 12 even more securely.

As shown in the embodiments in FIGS. 1 and 2, the compressed diameter portions 10, 11 may be formed over a wide range toward the base from the tip of the tubular portion 5 and not limited to a narrow region of the tip of the tubular portion 5 to fasten the valve member 12 even more securely. However, in an embodiment in which the valve member 12 is secured over a narrow region, the ratio of rearward elongation can be increased and the elongation of the tip portion 14 that directly affects performance of an on-off valve can be made very small.

Moreover, this embodiment does not prohibit the use of an adhesive, and an adhesive can be coated on the outer circumference of a portion of the base portion 13 of the valve member 12 into which the compressed diameter portion 10, 11 is embedded to increase the degree of fastening. If this is to be done, the application of the adhesive is very simple, so the valve body can be manufactured without requiring a complicated step. Moreover, securing with the adhesive alone without the combined use of the compressed diameter portions 10, 11 and the adhesive is also possible. In this case, the adhesive can be applied to the outer circumference of the base portion 13 located in the tip opening of the attachment hole 6 to perform fastening.

FIG. 3 shows an embodiment for manufacturing the valve member and body shown in FIG. 1. In FIG. 3(A), the valve element 1 and an elastic member 17 are readied. The valve element 1 is made of metal, and, as illustrated in FIG. 1, comprises a round-axle communicating portion 2 with a plurality of axial grooves 3 on the outer circumference, a latching portion 4 provided in a unitary manner on the base thereof and a tubular portion 5 protruding from the tip. An attachment hole 6 and a small-diameter hole portion 7 on the inner end thereof are located in the interior of the tubular portion 5. The elastic member 17 is made of an elastic polymer, has a diameter equivalent to or slightly smaller than the diameter of the attachment hole 6, and is a cylindrical unit longer than the depth of the attachment hole 6.

Figure 3A:
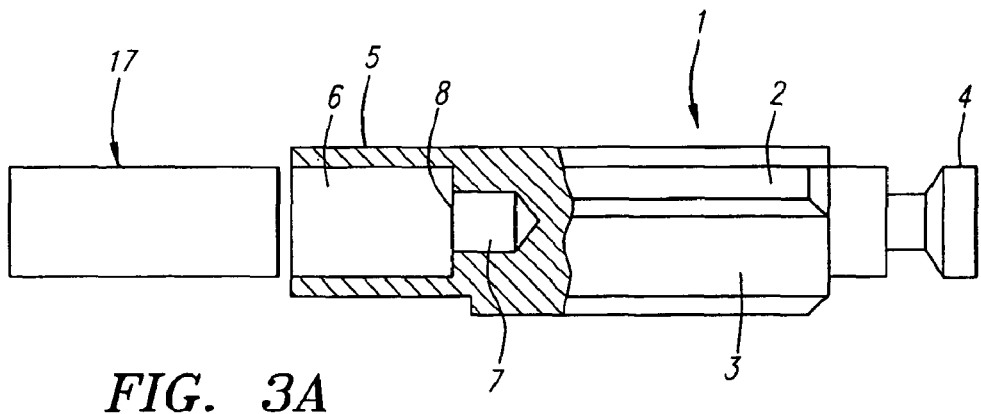
FIGS. 3(A), (B), (C) and (D) are process diagrams illustrating an embodiment of a method for manufacturing the valve body of the invention.
Figure 3B:
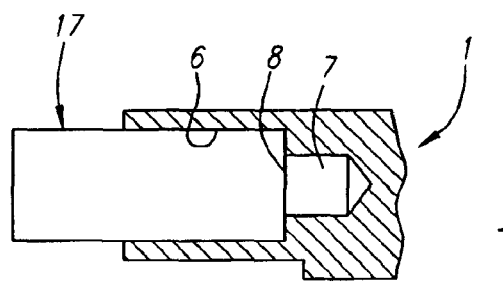

First, the elastic member 17 is inserted into the attachment hole 6 and as is shown in FIG. 3(B), is joined with the valve element 1 so that the base surface overlaps with the stepped bore portion 8 that is the inner end of the attachment hole 6. Alternatively, the elastic member 17 could be inserted to a certain depth while leaving part of the inner end of the attachment hole 6 unfilled using a valve element 1 having an attachment hole 6 lacking a small-diameter hole portion 7 on the inner end thereof. However, according to this embodiment, the elastic member 17 is fastened at a certain depth so a tip portion of a constant length can always be made to protrude forward, which advantageously allows the formation of a valve face 15, which will be discussed later, to be performed precisely.

Figure 3C:
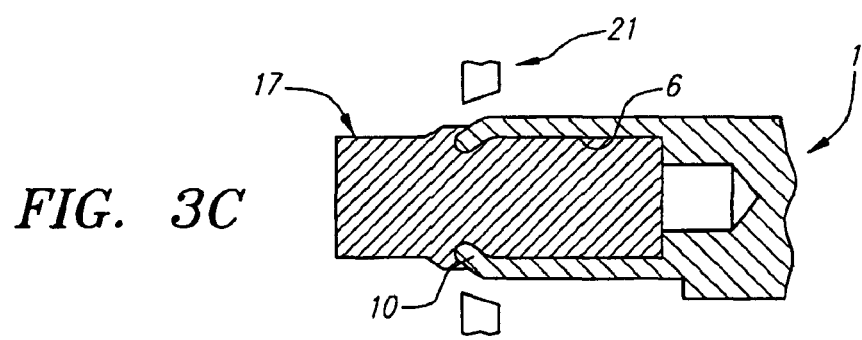

Next, as is shown in FIG. 3(C), the wall of the tip portion of the tubular portion 5, i.e., the tip portion of the attachment hole 6, is crimped using a crimping tool 21 to compress it to form a compressed diameter portion 10 and embed it into the elastic member 17. Through this step, the base side of the elastic member 17 is secured in the attachment hole 6, and the tip side thereof is secured in a state protruding from the front of the valve element 1.

Figure 3D:
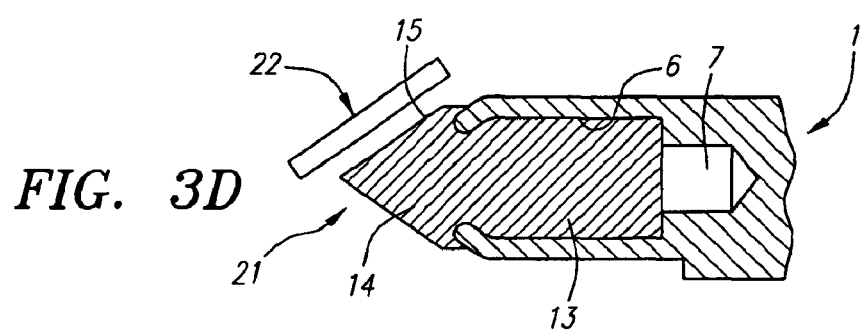
Figure 4A:
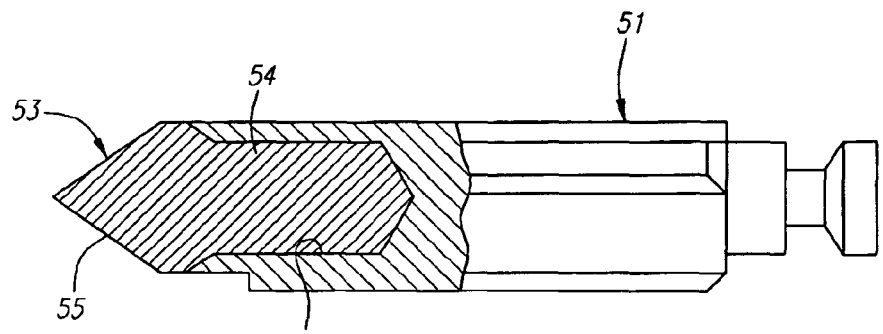
FIGS. 4(A) and (B) are partially cutaway plan views illustrating different examples of the prior art.
Figure 4B:
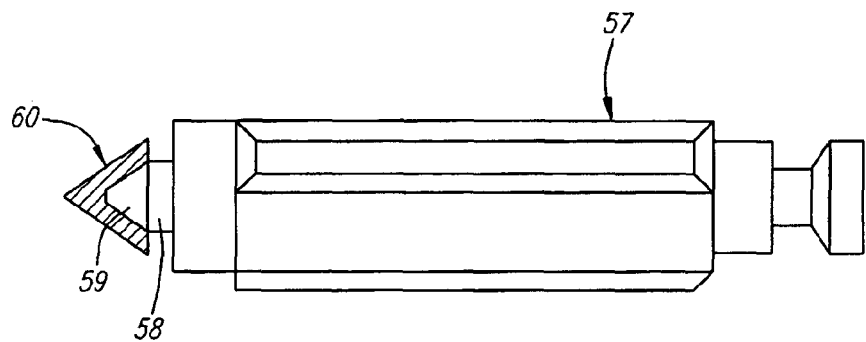

And as shown in FIG. 3(D), the portion of the elastic member 17 protruding from the front of the valve element 1 is given a conical shape of a prescribed apex using a cutting tool 22 that uses a grinding stone and polishing paper for grinding and polishing in combination or separately.

Through the above steps, a valve member 12 is formed from an elastic polymer member comprising a base portion 13, which is secured into the attachment hole 6, and a conical tip portion 14 with an outer circumference that forms the valve face 15 for a valve seat.

The above-mentioned manufacturing process is an embodiment involving a valve element 1 made of metal, but it is not limited to metal, and the invention can also appropriately use a hard synthetic resin. A valve body in which the valve element 1 made with a hard synthetic resin is manufactured by, for example, giving it the same shape and construction as that shown in FIG. 3(A), inserting the elastic member 17 in the attachment hole 6 to bring about the condition shown in FIG. 3(B), applying heat from electrical resistance or high-frequency vibration to the tip portion of the tubular portion 5 to cause it to contract under heat, thereby forming a contracted portion 10 that is embedded in the elastic member 17, and using the cutting tool 22 shown in FIG. 3(D) to form the prescribed valve face 15.

The elastic member 17 can be secured in the valve element 1 using an adhesive. The adhesive is applied to the outer circumference of the elastic member 17 located at the opening of the tip of the attachment hole 6 to secure the elastic member to the valve element 1 in concert with the constricted diameter portion 10 or using the adhesive alone without constricting the tubular portion 5.

The long elastic member 17 can be attached to the valve element 1 by first readying a long elastic member, and, after inserting it into the attachment hole 6, cutting it off at a spot where it protrudes out for a certain length and then repeating this process in order. However, readying elastic members that have already been cut to the prescribed length allows them to be inserted efficiently to a plurality of valve elements 1 or insertion to be performed either with manual insertion or automatically using a dedicated assembling machine. This advantageously adds options to the list of manufacturing means.

Moreover, the elastic member 17 is not limited to a cylindrically shaped object. Also useful is an elastic member 17 made with a valve face comprising a surface that is conically or spherically formed to correspond to the seat surface of the valve seat, which comprises a planar surface perpendicular to the direction of valve movement, or a valve face of any of a variety of other shapes that provides a shape suitable for formation with minimal grinding or polishing, such as providing the portion to become the base portion 13 upon insertion into the attachment hole 6 with a cylindrical shape and making the portion protruding forward a conical, spherical, or trapezoidal shape.

As has been discussed, according to the present invention, the axial elongation due to swelling of the valve member made of an elastic polymer material is both forward and rearward such that the elongation of the portion that forms the valve face for the valve seat is small, the change in opening and closing characteristics due to swelling is minimized, deviation from the settings for on-off timing are minimized, and opening and closing actions are performed within a tolerable range that allows the fluid flow rate to be controlled in a stable manner.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A valve body of an on-off valve comprising a valve element, and a valve member being made with an elastic polymer material and forming a valve face for a valve seat, the valve member having an elongate body having an axial length greater than its diameter, wherein a base portion of the body is inserted in a hole provided at a tip portion of the valve element with space remaining at the hole bottom, and the valve face is formed at a tip portion of the body that protrudes forward from the attachment hole, wherein the base portion is secured in the attachment hole by securing the body at a tip opening of the attachment hole causing axial elongation of the body due to the swelling to occur inwardly into the attachment as well as into said space hole and outwardly away from the attachment hole.

2. The valve body of claim 1, wherein a tip opening of the attachment hole is given a constricted diameter to secure the base portion of the valve member.

3. The valve body of claim 1, wherein toothing is provided in a circumference of the attachment hole, and the base portion is secured by embedding the toothing of the attachment hole.

4. The valve body of claim 1, wherein the valve member is secured with an adhesive to the tip opening of the attachment hole.

5. The valve body of claim 1 wherein the base portion extending into the hole is longer than the tip portion of the body of the valve member protruding from the tip portion of the hole causing greater inward axial elongation of the body of the valve member into the hole than out of the hole.

6. A valve body of an on-off valve comprising a valve element having an axle form body and a tubular portion extending from one end of the body, the tubular portion having a hole formed there in, and a valve member having having an elongate body having an axial length greater than its diameter, wherein a base portion of the body is inserted in the hole in the tubular portion of the valve element in spaced relation with the hole bottom, the valve member being formed of an elastic polymer material and including a valve face formed on an end of a tip portion extending from the hole in the tubular portion of the valve element, wherein the base portion is secured in the attachment hole by securing the body at a tip opening of the attachment hole causing axial elongation of the body due to the swelling to occur inwardly into the attachment as well as into said space hole and outwardly away from the attachment hole.

7. The valve body of claim 6 wherein a tip opening of the hole in the tubular portion is constricted to secure the base portion of the valve member.

8. The valve body of claim 6 wherein the valve member is secured with an adhesive to a tip opening of the hole in the tubular portion of the valve element.

9. The valve body of claim 6 further comprising a latching portion extending from a base end of the body of the valve element.

10. The valve body of claim 9 wherein the latching portion is integrally formed with the body.

11. The valve body of claim 9 wherein the latching portion includes a head portion and a neck portion interposing the head portion and the body of the valve element.

12. The valve body of claim 6 wherein the body of the valve element includes a plurality of axial extending grooves.

13. The valve body of claim 12 wherein the outer diameter of the tubular portion substantially equals the diameter of the body at the base of the grooves.

14. The valve body of claim 6 wherein the base portion extending into the hole is longer than the tip portion of the body of the valve member protruding from the tip portion of the hole causing greater inward axial elongation of the body of the valve member into the hole than out of the hole.

* * * * *